3,035,068
3-ALDEHYDO AND 3-HYDROXY-METHYL-AN-
DROSTANES AND PROCESS FOR SAME
Albert Bowers and John Edwards, Mexico City, Mexico, assignors to Syntex S.A., Mexico City, Mexico, a corporation of Mexico
No Drawing. Filed May 31, 1961, Ser. No. 113,643
21 Claims. (Cl. 260—397.4)

The present invention relates to novel cyclopentanophenanthrene compounds and to a process for the production thereof.

More particularly the present invention relates to novel 3-aldehydro- and 3-hydroxymethyl-androstane derivatives.

The novel compounds of the present invention are represented by the following fomulas:

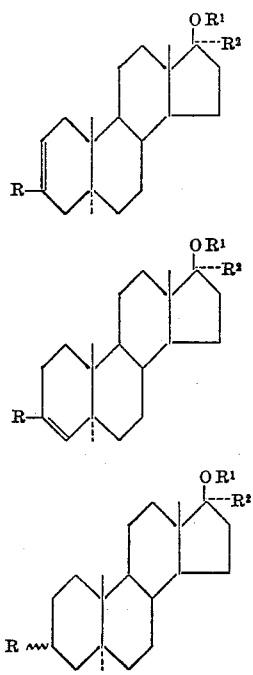

In the above formulas R may be formyl (CHO) or the group —$CH_2$—$OR^3$ wherein $R^3$ represents hydrogen or a hydrocarbon carboxylic acyl group containing up to 12 carbon atoms; in formula C, R may be in the 3α or 3β-position; $R^1$ represents hydrogen or a hydrocarbon carboxylic acyl group containing up to 12 carbon atoms; $R^2$ represents hydrogen or an alkyl, alkenyl or alkinyl group containing up to 8 carbon atoms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formula wherein $R^2$ represents hydrogen or an alkyl group are anabolic-androgenic agents with a favorable anabolic ratio. These compounds also relieve premenstrual tension, lower the blood cholesterol level and exhibit anti-estrogenic and anti-gonadotropic activities.

The compounds represented by the above formula wherein $R^2$ represents an alkenyl or an alkenyl group are progestational agents with a high degree of oral activity. In addition, these compounds lower premenstrual tension and exhibit anti-estrogenic and anti-gonadotropic activities.

The novel saturated compounds are prepared by the process illustrated by the following equation:

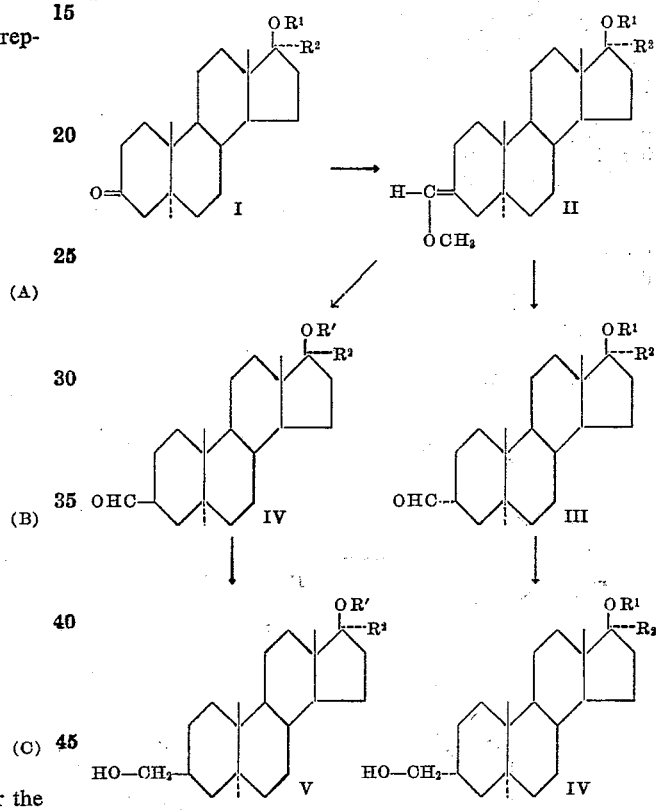

In the above formula $R^1$ and $R^2$ have the same meaning as heretofore set forth.

In practicing the process outlined above, the starting compound which is a dihydroallotestosterone derivative (I) is treated with triphenyl (methoxymethyl)phosphonium chloride in an inert solvent such as ether and in the presence of an alkyl or aryl lithium compound, preferably phenyl lithium, affording the corresponding 3-methoxymethylene-androstan-17β-ol derivative (II). This compound is hydrolyzed with an acid, preferably perchloric acid, thus giving a mixture of the corresponding 3α-aldehydo (III) and 3β-aldehydo (IV) derivatives which are separated into the two components by silica gel chromatography. Reduction of these aldehydo compounds with a double metal hydride, preferably lithium aluminum hydride, affords the corresponding 3α-hydroxymethyl (IV) or 3β-hydroxymethyl (V) derivatives.

The novel Δ$^3$-androstene derivatives of the present invention are prepared by the process illustrated by the following equation:

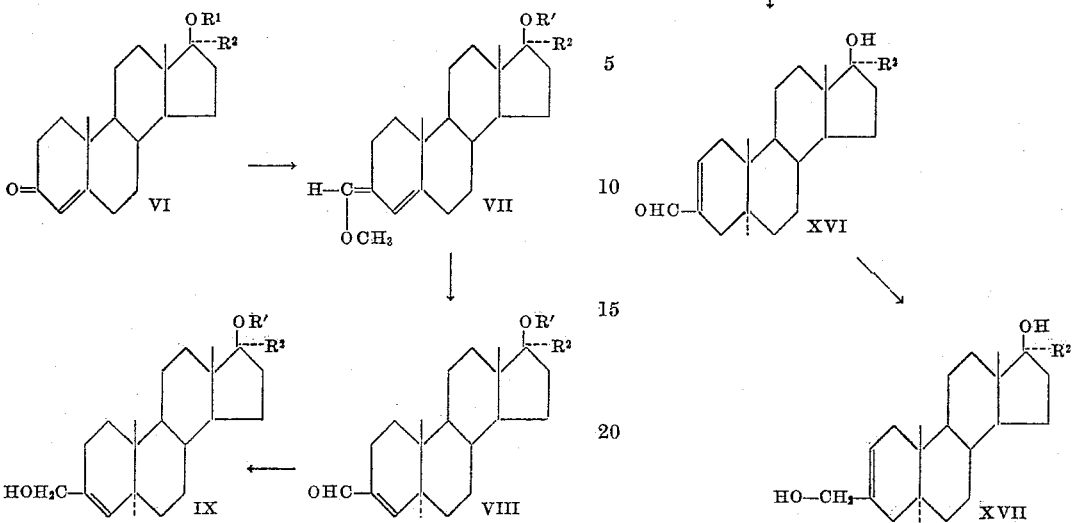

In the above formulas, $R^1$ and $R^2$ have the same meaning as previously defined.

In practicing the process outlined above the starting testosterone derivative (VI) is treated with triphenyl (methoxymethyl) phosphonium chloride in an inert solvent and in the presence of an alkyl or aryl lithium compound, preferably phenyl lithium, giving the corresponding 3-methoxymethylene-$\Delta^4$-androsten-17$\beta$-ol derivative (VII). This compound upon hydrolysis with an acid, such as perchloric acid, affords the corresponding 3-aldehydo-$\Delta^3$-androsten-17$\beta$-ol derivative (VIII) which upon reduction, preferably with lithium aluminum hydride furnishes the respective 3-hydroxymethyl-$\Delta^3$-androsten-17$\beta$-ol derivative (IX).

The novel $\Delta^2$-androstene derivatives of the present invention are prepared by the process illustrated by the following equation:

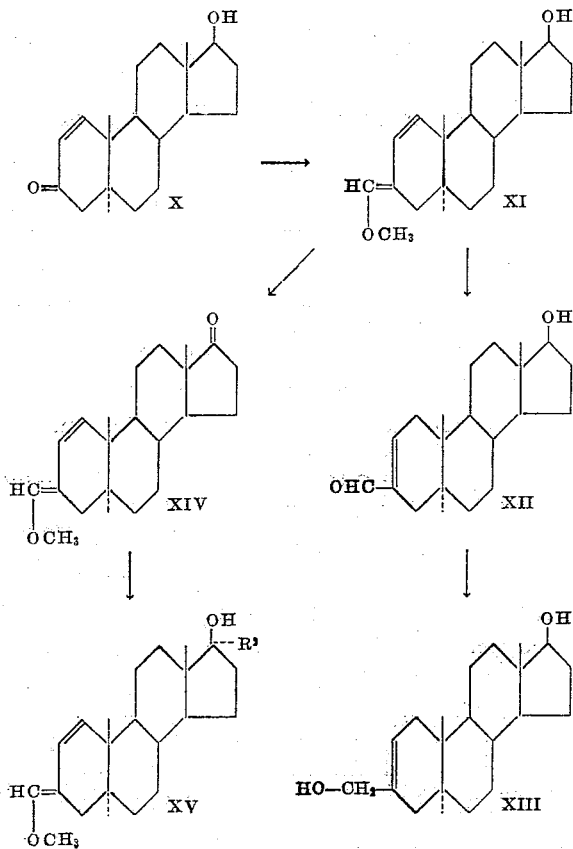

In the above formulas, $R^2$ has the same meaning as hereinbefore set forth.

In practicing the process above outlined the starting compound $\Delta^1$-androsten-17$\beta$-ol-3-one (X), [Butenandt and Dannenberg, Ber. 73, 206 (1940)], is treated with triphenyl (methoxymethyl) phosphonium chloride in an inert solvent and in the presence of an alkyl or aryl lithium compound, preferably phenyl lithium, giving 3-methoxymethylene-$\Delta^1$-androsten-17$\beta$-ol (XI). Hydrolysis of this compound affords the corresponding 3-aldehydo derivative (XII) which upon reduction furnishes 3-hydroxymethyl-$\Delta^2$-androsten-17$\beta$-ol (XIII).

Upon oxidation of 3-methoxymethylene-$\Delta^1$-androsten-17$\beta$-ol (XI) in an alkaline medium, such as pyridine in order not to hydrolyze the enol-ether group and using as an oxidizing agent preferably chromium trioxide, there is formed the corresponding 17-keto compound (XIV). This steroid, by treatment with a Grignard reagent, such as methyl, vinyl, or ethynyl magnesium bromide, affords the corresponding 17$\alpha$-alkyl, alkenyl or alkynyl-17$\beta$-ol derivative (XV). Upon hydrolysis of the 3-methoxymethylene group of this latter compound, there is obtained the corresponding 3-aldehyde-$\Delta^2$-androsten-17$\beta$-ol derivative (XVI) which upon reduction forms the 3-hydroxymethyl derivative (XVII).

The heretofore obtained compounds having a primary hydroxyl, such as the one present in the hydroxymethyl group, or a secondary hydroxyl, such as the one present in the 17$\beta$-alcohols with a hydrogen at the 17$\alpha$-position, are conventionally acylated in pyridine, with an acylating agent, as for example, acetic anhydride or propionic anhydride to give the corresponding mono- or diester.

The compounds of the present invention with a tertiary hydroxyl, such as the 17$\beta$-hydroxyl of the 17$\alpha$-substituted compounds, are conventionally acylated with excess acylating agent, in the presence of p-toluenesulfonic acid, to give the corresponding 17$\beta$-acyloxy compounds.

The following specific examples serve to illustrate but are not intended to limit the scope of the present invention:

*Example I*

2.2 g. of triphenyl (methoxymethyl) phosphonium chloride were suspended in 50 cc. of anhydrous ether. The air in the reaction flask was displaced by nitrogen and then 6.8 cc. of 1 N solution of phenyl lithium in ether were added. The reaction mixture was stirred for one hour, then a solution of 1 g. of dihydroallotestosterone in 100 ml. of anhydrous ether was added dropwise during 30 minutes. The resulting mixture was further stirred overnight. The ether was removed by distillation; during this process, 150 cc. of tetrahydrofuran was added. When all the ether had distilled, the mixture was refluxed for 6 hours and then part of the solvent removed under vacuum. The concentrated solution was poured into water and the product extracted with methylene chloride. The extract was washed with water, dried over anhydrous sodium sulfate and evaporated to dryness. Crystallization of the residue from acetone-hexane afforded 3-methoxymethylene-androsten-17β-ol.

When applying the method described above to 17α-methyl-dihydroallotesterone, 17α-vinyl-dihydroallotestosterone and 17α-ethynyl-dihydroallotestosterone, there were respectively obtained 3-methoxymethylene-17α-methyl-androsten-17β-ol, 3-methoxymethylene-17α-vinyl-androsten-17β-ol and 3-methoxymethylene-17α-ethynyl-androsten-17β-ol.

*Example II*

A solution of 1 g. of 3-methoxymethylene-androsten-17β-ol in 50 cc. of ether was treated with 50 cc. of ether saturated with perchloric acid for 30 minutes. The solution was then washed with 5% aqueous sodium bicarbonate solution and water, dried over sodium sulfate and evaporated to dryness. The mixture of 3α-aldehyde and 3β-aldehyde thus obtained was separated by chromatography on silica gel. The two compounds were separately recrystallized from ether-hexane, furnishing 3α-aldehydo-androstan-17β-ol and 3β-aldehydo-androstan-17β-ol.

Upon treatment by the above procedure of the 17α-substituted compounds produced in the preceding example, there were respectively obtained: 3α-aldehydo-17α-methyl-androstan-17β-ol, 3β-aldehydo - 17α - methyl-androstan-17β-ol, 3α - aldehydo-17α-vinyl-androstan-17β-ol, 3β - aldehydo - 17α - vinyl-androstan-17β-ol, 3α-aldehydo-17α-ethynyl-androstan - 17β - ol and 3β-aldehydo-17α-ethynyl-androstan-17β-ol.

*Example III*

A solution of 750 mg. of 3α-aldehydo-androstan-17β-ol in 50 cc. of tetrahydrofuran was added over a 30 minutes period to a stirred suspension of 700 mg. of lithium aluminum hydride in 50 cc. of anhydrous tetrahydrofuran. The mixture was refluxed for 2 hours, then cooled, and cautiously treated with 5 cc. of ethyl acetate and 2 cc. of water. Solid sodium sulfate was added, the inorganic material filtered off and thoroughly washed with hot ethyl acetate. The combined organic solutions upon evaporation yielded a crude material which was purified by crystallization from acetone-hexane, thus giving 3α-hydroxymethyl-androstan-17β-ol.

All of the above obtained 3-aldehydes were reduced by this method, affording the corresponding products set forth hereafter.

| Starting aldehyde | Product |
|---|---|
| 3β-aldehydo-androstan-17β-ol | 3β-hydroxymethyl-androstan-17β-ol. |
| 3α-aldehydo-17α-methyl androstan-17β-ol | 3α - hydroxymethyl - 17α -methyl - androstan-17β-ol. |
| 3β-aldehydo - 17α- methyl - androstanstan-17β-ol | 3β - hydroxymethyl - 17α -methyl - androstan-17β-ol. |
| 3α - aldehydo- -17α - vinyl - androstan-17β-ol | 3α - hydroxymethyl - 17α - vinyl - androstan-17β-ol. |
| 3β - aldehydo - 17α - vinyl androstan-17β-ol | 3β - hydroxymethyl - 17α - vinyl - androstan-17β-ol. |
| 3α-aldehydo-17α-ethynyl-androstan-17β-ol | 3α- hydroxymethyl - 17α - ethynyl - androstan-17β-ol. |
| 3β-aldehydo-17α-enthynyl-androstan-17β-ol | 3β-hydroxymethyl - 17α - ethynyl - androstan-17β-ol. |

*Example IV*

1 g. of testrosterone was treated following the procedure described in Example I, thus affording 3-methoxymethylene-$\Delta^4$-androsten-17β-ol.

Following the same method there were treated 17α-methyltestrosterone, 17α-vinyl-testosterone and 17α-ethynyl-testosterone, thus furnishing correspondingly 3-methoxymethylene - 17α - methyl-$\Delta^4$-androsten-17β-ol, 3-methoxymethylene-17α-vinyl-$\Delta^4$-androsten-17β-ol, and 3-methoxymethylene-17α-ethynyl-$\Delta^4$-androsten-17β-ol.

*Example V*

1 g. of 3-methoxymethylene-$\Delta^4$-androsten-17β-ol was hydrolyzed with perchloric acid in accordance with Example II, to give 3-aldehydo-$\Delta^3$-androsten-17β-ol.

Upon treatment by the same method of 3-methoxymethylene-17α-methyl-$\Delta^4$-androsten-17β-ol, 3 - methoxymethylene - 17α - vinyl-$\Delta^4$ - androsten - 17β - ol, and 3-methoxymethylene-17α-ethynyl-$\Delta^4$-androsten-17β-ol, there were respectively obtained: 3 - aldehydo-17α-methyl-$\Delta^3$-androsten - 17β-ol, 3 - aldehydo-17α-vinyl-$\Delta^3$-androsten-17β-ol, and 3 - aldehydo-17α-ethynyl-$\Delta^3$-androsten-17β-ol.

*Example VI*

750 mg. of 3 - aldehydo-$\Delta^3$-androsten-17β-ol were reduced with lithium aluminum hydride following the procedure described in Example III, thus furnishing 3-hydroxymethyl-$\Delta^3$-androsten-17β-ol.

When applying this reduction to 3 - aldehydo - 17α-methyl-$\Delta^3$-androsten - 17β - ol, 3 - aldehydo-17α-vinyl-$\Delta^3$-androsten-17β-ol, and 3 - aldehydo - 17α - ethynyl-$\Delta^3$-androsten-17β-ol, there were correspondingly obtained: 3-hydroxymethyl-17α-methyl - $\Delta^3$ - androsten-17β-ol, 3-hydroxymethyl-17α-vinyl-$\Delta^3$-androsten - 17β - ol, and 3-hydroxymethyl-17α-ethynyl-$\Delta^3$-androsten-17β-ol.

*Example VII*

5 g. of $\Delta^1$-androsten - 17β-ol-3-one [Butenandt and Dannenberg, Ber. 73, 206, (1940)], were treated with 11g. of triphenyl (methoxymethyl) phosphonium chloride, following the technique described in Example I, thus affording 3-methoxymethylene-$\Delta^1$-androsten-17β-ol.

*Example VIII*

A solution of the above compound in 100 cc. of pyridine was added to a mixture of 5 g. of chromium trioxide in 100 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 3-methoxymethylene-$\Delta^1$-androsten-17-one.

*Example IX*

A solution of 4 g. of the foregoing steroid in 200 cc. of thiophene-free benzene was treated with 22 cc. of 4 N methyl magnesium bromide in ether and the mixture refluxed with the exclusion of moisture, for 3 hours. The cooled mixture was cautiously treated with excess aqueous ammonium chloride solution and the product isolated by ethyl acetate extraction. The extract was washed with water, dried over anhydrous sodium sulfate and evaporated to dryness. Recrystallization from methylene chloride-hexane afforded 3-methoxymethylene-17α-methyl-$\Delta^1$-androsten-17β-ol.

Using exactly the same conditions described above, except that methyl magnesium bromide was substituted by vinyl magnesium bromide and ethynyl magnesium bromide, there were respectively obtained: 3-methoxymethylene-17α-vinyl-$\Delta^1$-androsten-17β-ol, and 3 - methoxymethylene-17α-ethynyl-$\Delta^1$-androsten-17β-ol.

Example X 1 g. of 3-methoxymethylene-Δ¹-androsten-17β-ol obtained in accordance with Example VII, was hydrolyzed with perchloric acid following the technique described in Example II, thus affording 3-aldehydo-Δ²-androsten-17β-ol.

Upon hydrolysis of 3-methoxymethylene-17α-methyl-Δ¹-androsten-17β-ol, 3-methoxymethylene-17α-vinyl-Δ¹-androsten-17β-ol, and 3-methoxymethylene-17α-ethynyl-Δ¹-androsten-17β-ol, by the same technique, there were correspondingly obtained 3-aldehydo-17α-methyl-Δ²-androsten-17β-ol, 3-aldehydo-17α-vinyl-Δ²-androsten-17β-ol, and 3-aldehydo-17α-ethynyl-Δ²androsten-17β-ol.

Example XI 750 mg. of 3-aldehydo-Δ²-androsten-17β-ol were reduced with lithium aluminum hydride in accordance with Example III thus furnishing 3-hydroxymethyl-Δ²-androsten-17β-ol.

Following the same method were reduced 3-aldehydo-17α-methyl-Δ²-androsten-17β-ol, 3-aldehydo-17α-vinyl-Δ²-androsten-17β-ol, and 3-aldehydo-17α-ethynyl-Δ²-androsten-17β-ol, giving correspondingly 3-hydroxymethyl-17α-methyl-Δ²-androsten-17β-ol, 3-hydroxymethyl-17α-vinyl-Δ²-androsten-17β-ol, and 3-hydroxymethyl-17α-ethynyl-Δ²-androsten-17β-ol.

Example XII

A mixture of 500 mg. of 3α-hydroxymethyl-androstan-17β-ol, 4 cc. of pyridine and 2 cc. of acetic anhydride was kept at room temperature overnight, poured into ice water, the formed precipitate was filtered, washed with water and dried. Crystallization from acetonehexane gave the 17-acetate of 3α-acetoxymethyl-androstan-17β-ol.

Following the same technique were acetylated 3-hydroxymethyl-Δ³-androsten-17β-ol and 3-hydroxymethyl-Δ²-androsten-17β-ol, furnishing 3-acetoxymethyl-Δ³-androsten-17β-ol-17-acetate and 3-acetoxymethyl-Δ²-androsten-17β-ol-17-acetate.

By exactly the same procedure except that acetic anhydride was substituted by propionic anhydride, caproic anhydride and benzoyl chloride, there were obtained respectively the dipropionates, dicaproates and dibenzoates of the above diols.

Example XIII 1 g. of 3α-hydroxymethyl-17α-methyl-androstan-17β-ol was treated with acetic anhydride by the technique described in the foregoing example furnishing 3α-acetoxymethyl-17α-methyl-androstan-17β-ol.

Following the same technique were treated 3α-aldehydo-androstan-17β-ol, 3 aldehydo-Δ²-androstan-17β-ol, 3-hydroxymethyl-17α-vinyl-Δ³-androsten-17β-ol, and 3-hydroxymethyl-17α-ethynyl-Δ²-androsten-17β-ol, yielding correspondingly 17-acetate of 3α-aldehydo-androstan-17β-ol, 17-acetate of 3-aldehydo-Δ²-androsten-17β-ol, 3-acetoxymethyl-17α-vinyl-Δ³-androsten-17β-ol, and 3-acetoxymethyl-17α-ethynyl-Δ²-androsten-17β-ol.

Example XIV

A mixture of 1 g. of 3β-hydroxymethyl-17α-methyl-androstan-17β-ol, 1 g. of p-toluenesulfonic acid monohydrate, 50 cc. of acetic acid and 25 cc. of acetic anhydride was kept for one hour at room temperature. It was then poured into water and stirred until the excess anhydride had hydrolyzed. Isolation of the product by methylene chloride extraction and crystallization of the residue from acetone-ether gave 3β-acetoxymethyl-17α-methyl-androstan-17β-ol-17-acetate.

Following the above technique were treated the starting compounds listed below with the acylating agent indicated furnishing the products hereafter set forth.

| Starting compound | Acylating agent | Product |
|---|---|---|
| 3-hydroxymethyl-17α-ethynyl-Δ²-androsten-17β-ol. | acetic anhydride | 17-acetate of 3-acetoxymethyl-17α-ethynyl-Δ²-androsten-17β-ol. |
| 3-hydroxymethyl-17α-vinyl-Δ³-androsten-17β-ol. | propionic anhydride | 17-propionate of 3-propionoxymethyl-17α-ethynyl-Δ²-androsten-17β-ol. |
| Do | acetic anhydride | 17-acetate of 3-acetoxymethyl-17α-vinyl-Δ³-androsten-17β-ol. |
| Do | cyclopentyl-propionic anhydride. | 17-cyclopentylpropionate of 3-cyclopentyl-propionoxy-17α-vinyl-Δ³-androsten-17β-ol. |
| 3-acetoxymethyl-17α-methyl androstan-17β-ol. | caproic anhydride | 17-caproate of 3-acetoxy-methyl 17α-methyl-androstan-17β-ol. |
| 3-acetoxymethyl-17α-vinyl-Δ³-androsten-17β-ol. | propionic anhydride | 17-propionate of 3-acetoxymethyl-17α-vinyl-Δ³-androsten-17β-ol. |
| 3-acetoxymethyl-17α-ethynyl-Δ²-androsten-17β-ol. | cyclopentyl-propionic anhydride. | 17-cyclopentyl-propionate of 3-acetoxymethyl-17α-ethynyl-Δ²-androsten-17β-ol. |
| 3α-aldehydo-17α-methyl-androstan-17β-ol. | propionic anhydride | 17-propionate of 3α-aldehydo-17α-methyl-androstan-17β-ol. |
| 3-aldehydo-17α-vinyl-Δ²-androsten-17β-ol. | caproic anhydride | 17-caproate of 3-aldehydo-17α-vinyl-Δ²-androsten-17β-ol. |
| 3-aldehydo-17α-ethynyl-Δ³-androsten-17β-ol. | cyclopentyl-propionic anhydride. | 17-cyclopentyl-propionate of 3-aldehydo-17α-ethynyl-Δ³-androsten-17β-ol. |

We claim:

1. A compound of the following formula:

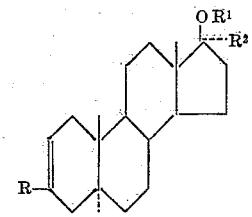

wherein R is selected from the group consisting of —CHO and —CH₂OR³ in which R³ is selected from the group consisting of hydrogen and a hydrocarbon carboxylic acyl group of less than 12 carbon atoms; R¹ has the same meaning as R³ and R² is selected from the group consisting of hydrogen, alkyl, alkenyl and alkynyl groups containing up to eight carbon atoms.

2. 3-aldehydo-Δ²-androsten-17β-ol.
3. 3-aldehydo-17α-vinyl-Δ²-androsten-17β-ol.
4. 3-hydroxymethyl-Δ²-androsten-17β-ol.
5. 3-hydroxymethyl-17α-vinyl-Δ²-androsten-17β-ol.
6. 17-acetate of 3-aldehydo-Δ²-androsten-17β-ol.
7. 17-acetate of 3-acetoxymethyl-17α-ethynyl-Δ²-androstan-17β-ol.
8. A compound of the following formula:

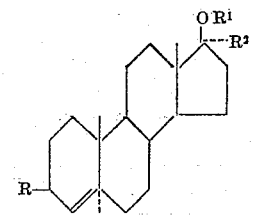

wherein R is selected from the group consisting of —CHO and —CH₂OR³ in which R³ is selected from the group consisting of hydrogen and a hydrocarbon carboxylic acyl group of less than 12 carbon atoms; R¹ has the same meaning as R³ and R² is selected from the group consisting of hydrogen, alkyl, alkenyl and alkynyl groups containing up to eight carbon atoms.

9. 3-aldehydo-Δ³-androstan-17β-ol.
10. 3-aldehydo-17α-ethynyl-Δ³-androstan-17β-ol.
11. A compound of the following formula:

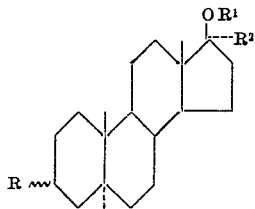

wherein R is selected from the group consisting of —CHO and —CH$_2$OR³ in which R³ is selected from the group consisting of hydrogen and a hydrocarbon carboxylic acyl group of less than 12 carbon atoms; R¹ has the same meaning as R³; and R² is selected from the group consisting of hydrogen, alkyl, alkenyl and alkynyl groups containing up to eight carbon atoms.

12. 3α-aldehydo-androstan-17β-ol.
13. 3β-aldehydo-androstan-17β-ol.
14. 3α-aldehydo-17α-methyl-androstan-17β-ol.
15. 3β-aldehydo-17α-methyl-androstan-17β-ol.
16. 3α-hydroxymethyl-androstan-17β-ol.
17. 3β-hydroxymethyl-androstan-17β-ol.
18. 3α-acetoxymethyl-androstan-17β-ol-17-acetate.
19. 3α-acetoxymethyl-17α-methyl-androstan-17β-ol.
20. A process for the production of 3-hydroxymethyl androstane derivatives which comprises treating the corresponding 3-ketone with triphenyl (methoxymethyl) phosphonium chloride in the presence of a compound selected from the group consisting of an alkyl lithium and an aryl lithium to give the corresponding 3-methoxymethylene compound, hydrolyzing the latter compound and thereafter reducing the thus formed 3-aldehydo derivative with a double metal hydride.
21. The process of claim 20 wherein the aryl lithium compound is phenyl lithium and the double metal hydride is lithium aluminum hydride.

No references cited.